(12) United States Patent
Albou et al.

(10) Patent No.: US 8,398,278 B2
(45) Date of Patent: Mar. 19, 2013

(54) LIGHTING DEVICES, PARTICULARLY WITH LIGHT-EMITTING DIODES, ABLE TO GENERATE AN ADAPTATIVE LIGHT BEAM

(75) Inventors: Pierre Albou, Paris (FR); Vanesa Sanchez, Paris (FR); Jonathan Blandin, Les Pavillons Sous Bois (FR)

(73) Assignee: Valeo Vision, Bobigny (FR)

( * ) Notice: Subject to any disclaimer, the term of this patent is extended or adjusted under 35 U.S.C. 154(b) by 170 days.

(21) Appl. No.: 12/796,842

(22) Filed: Jun. 9, 2010

(65) Prior Publication Data
US 2011/0002133 A1   Jan. 6, 2011

(30) Foreign Application Priority Data
Jun. 10, 2009   (FR) ..................................... 09 53827

(51) Int. Cl.
*B60Q 1/00* (2006.01)
(52) U.S. Cl. ......... 362/465; 362/466; 362/523; 362/545
(58) Field of Classification Search .................. 362/465, 362/466, 523, 545
See application file for complete search history.

(56) References Cited

U.S. PATENT DOCUMENTS

| | | | |
|---|---|---|---|
| 6,572,248 B2 * | 6/2003 | Okuchi et al. | 362/464 |
| 7,040,792 B2 | 5/2006 | Brandenburg et al. | |
| 7,481,561 B2 | 1/2009 | Okuda | |
| 2005/0047169 A1 | 3/2005 | Brandenburg et al. | |
| 2008/0117642 A1 * | 5/2008 | Moizard et al. | 362/466 |
| 2008/0144329 A1 | 6/2008 | Okuda | |
| 2009/0122567 A1 * | 5/2009 | Mochizuki et al. | 362/509 |

FOREIGN PATENT DOCUMENTS

| | | |
|---|---|---|
| EP | 1935715 A1 | 6/2008 |
| EP | 2039567 A1 | 3/2009 |
| EP | 2060441 A1 | 5/2009 |
| EP | 2060442 A2 | 5/2009 |
| EP | 2193046 A1 | 6/2010 |
| WO | 2008037388 A2 | 4/2008 |
| WO | 2008155342 A1 | 12/2008 |
| WO | 2009039882 A1 | 4/2009 |

* cited by examiner

*Primary Examiner* — Evan Dzierzynski
(74) *Attorney, Agent, or Firm* — Jacox, Meckstroth & Jenkins

(57) ABSTRACT

A lighting device comprising a support for optical modules able to make a rotation movement, comprising a first optical module able to generate a light beam exhibiting a cutoff of the dipped beam type; a second optical module able to generate a light beam exhibiting a substantially L-shaped cutoff; the first optical module and the second optical module of the first lighting device being disposed on the optical module support able to make a rotation movement.

26 Claims, 2 Drawing Sheets

LIGHTING DEVICES, PARTICULARLY WITH LIGHT-EMITTING DIODES, ABLE TO GENERATE AN ADAPTATIVE LIGHT BEAM

CROSS-REFERENCE TO RELATED APPLICATIONS

This application claims priority to French Application No. 0953827 filed Jun. 10, 2009, which application is incorporated herein by reference and made a part hereof.

BACKGROUND OF THE INVENTION

1. Field of the Invention

The object of the present invention is a set of lighting devices with light-emitting diodes, the acronym for which is LEDs, able to generate an adaptive light beam. A lighting device, generally, is an optical unit able to generate a light beam, based on one optical module or several optical modules, and intended to be integrated in a headlight device.

2. Description of the Related Art

The field of the invention is in general terms that of motor vehicle headlights. In this field, various types of conventional headlights are known, among which there are primarily:

side lights with low intensity and range;

low or dipped beam lights, of higher intensity and a range on the road of around 80 meters, which are used essentially at night and where the distribution of the light beam is such that it makes it possible not to dazzle the driver of a vehicle being passed; the light beams of the dipped beam type differ with the type of traffic, on the left or on the right, in which they are used;

high beam lights of the long range type where the area of vision on the road is around 600 meters, and which must be switched off when passing another vehicle in order not to dazzle its driver;

fog lights; and a type of improved headlight, referred to as dual function, which combines the functions of dipped beam lights and high beam lights.

The conventional lighting devices that have just been mentioned, more particularly those that are used as dipped beams, produce light beams that are open to improvement when they are used under certain conditions. Thus, for example, when a vehicle is entering a bend, the headlights continue to illuminate straight in front of them whereas it would be more judicious to orient the light beams in the direction of the bend being taken. This is why, in addition to the conventional main headlight functions, particularly dipped beam and main beam, various improvements have gradually appeared.

Thus, elaborate functions have been seen, referred to as advanced functions, or AFS ("Advanced Front lighting System" in English meaning advanced front lighting system), among which there are also found particularly, directly relating to the invention, a so-called DBL function ("Dynamic Bending Light" in English meaning movable bending light, called "code virage" in French), which produces an orientable headlight, also referred to as a movable beam lighting device: such a lighting device is able to modify the orientation of a light beam produced by a lighting device so that, when the vehicle is entering a bend, the road is illuminated in an optimum fashion, following the geometry of the road.

In order to fulfill such a function, a first known technique consists of making the global beam of the lighting device movable by virtue of an actuator controlling the pivoting, at least partial, of the lighting device according to information coming from the vehicle, for example by means of a steering wheel angle sensor.

For all the headlights and side lights that have just been mentioned, conventionally, light sources of the halogen lamp or discharge lamp type are used. But for a few years now automotive equipment suppliers have proposed the use of light-emitting diodes, also called LEDs; this use for example relates to indicator lights or rear lights.

Light-emitting diodes offer a certain number of advantages. First of all, for a long time, it has been known that this type of diode does not radiate omni-directionally but radiates in a half space opposite to the substrate that supports the p-n junction of the diode in question; thus, by using a more directive radiation than halogen or discharge lamps, the quantity of energy lost is less. Next these diodes were recently improved in terms of radiation intensity. In addition the diodes emit radiation, for a long time in the red range, but now also particularly in white and orange, which increases their field of possible uses. The quantity of heat that they give off is relatively limited but a certain number of constraints, relating to the dissipation of heat, remains high in the case of power LEDs. Lastly, LEDs consume less energy, even at equal intensity of radiation, than discharge lamps or halogen lamps; they are compact and their particular shape offers novel possibilities for producing and arranging the complex surfaces that are associated with them, particularly when arranging them on electronic media of the flexible type.

In addition, with a general aim of making driving more comfortable in terms of visibility, dual function headlight devices are used; in the dual function optical modules of these headlight devices, the dipped beam function automatically switches to the high beam function and vice versa, the switching being dependent on the traffic conditions. With vehicles equipped with such dual function modules, the procedure starts by searching for the presence of a vehicle liable to be dazzled by using the high beam function. If no vehicle is detected, the high beam function is automatically activated. As soon as the presence of a vehicle is detected, the high beam function is automatically de-activated and the vehicle equipped with the dual function headlight again projects a light beam of the dipped beam type.

In practice the threshold value above which the absence of a detected vehicle authorizes switching over to the high beam function is roughly 600 metres. As soon as a vehicle is detected at less than 600 meters from the equipped vehicle, it is the dipped beam function which is activated. However this function only ensures satisfactory lighting to a distance of about 80 meters in the central section of the road, and 150 meters on the verges of the road along which the vehicle is travelling (that is to say the right verge with respect to right-hand traffic); the lighting thus being projected primarily on the right side of the road in the case of right-hand traffic, the left side of the road is substantially less illuminated. Thus, there exists many traffic configurations, in which the first vehicle liable to be dazzled is located more than 100 meters and less than 600 meters away from the equipped vehicle, for which the road lighting could be optimized, however without dazzling the driver of any another vehicle.

Thus, various solutions are proposed allowing the range of the beam to be adapted according to an estimated distance at which the vehicle being passed or followed is situated. Progressive light beams are then spoken of. Although these solutions may be satisfactory in terms of optimizing the range of the light beam, this is not the case if the side lighting of the road that is proposed is considered.

Thus, in the state of the art, solutions to cut off a global light beam emitted by a vehicle in various adjacent angular portions, each portion corresponding to an angular segment of the global beam are also proposed. Therefore, if the vehicle being passed or followed is present in a portion considered, an optimized global light beam would consist in rendering only the portion considered of the global light beam not dazzling. Selective light beams are then spoken of. A non-dazzling portion means an angular segment of the global light beam in which the beam is concentrated only under the horizontal when it reaches, or before reaching, the vehicle being followed or passed.

However solutions proposed in the state of the art for producing selective light beams in lighting devices also able to generate a light beam of the dipped beam type use all of the mechanical solutions including movable masks, producing variable cutoff lines depending on their positioning. Such devices, which are frequently in demand, encounter problems of reliability, particularly over the lifespan of the lighting device.

SUMMARY OF THE INVENTION

It is an aim of the invention to improve the reliability of lighting devices generating beams with variable cutoff lines.

According to one object of this invention, based on lighting devices offering DBL functionality and equipped with LEDs, a set of lighting devices able to generate, depending on the traffic conditions, a powerful selective light beam, which is unencumbered by the presence of a system of masks with all the risks of reliability and bulk, is proposed. Advantageously, in one particular embodiment of the invention, it is also proposed to generate the selective light beam progressively. To this end it is intended, notably, on the movable part of at least one of the lighting devices constituting the set of lighting devices according to the invention, to arrange at least one first light source of the LED type and a second light source of the LED type, each able to produce a particular elementary beam with a particular cutoff, the fusion of the various elementary beams generated allowing a selective beam to be obtained based on lighting devices that are simplified in terms of physical bulk.

The invention more particularly relates to a lighting device comprising an optical module support able to make a rotation movement on an approximately vertical axis, the lighting device comprising:

a first optical module able to generate a light beam exhibiting a cutoff of the dipped beam type;

a second optical module able to substantially generate a light beam exhibiting an L-shaped cutoff, with a roughly horizontal first part, which is interrupted by a rise ranging between 45° and 135° relative to the roughly horizontal part of the cutoff in question, the horizontal part of the cutoff in question extending either towards the right, or towards the left of the rise; and the first optical module and the second optical module being disposed on the optical module support able to make a rotation movement.

This embodiment makes it possible to be unencumbered by movable masks in order to produce a lighting device generating at the same time a beam comprising a cutoff of the dipped beam type and a beam with an L-shaped cutoff, the cutoff able to be used in the context of a selective beam. Thus, these lighting devices will be more reliable. In addition movable masks are very bulky, complicating the production of the lighting device in question. The devices according to the present invention therefore are less expensive.

The lighting devices according to the invention, in addition to the principal features stated in the preceding paragraph, can also exhibit one or more of the following supplementary features; any combination of these supplementary features, insofar as they do not mutually exclude one another, constitutes an advantageous exemplary embodiment of the invention:

the lighting device according to the present invention comprises a third optical module able to generate a light beam with flat cutoff;

the first optical module, the second optical module and/or the third optical module comprise at least one light source of the light-emitting diode type;

the first optical module comprises a single light-emitting diode;

the second optical module comprises a single light-emitting diode;

the third optical module able to generate a light beam with flat cutoff comprises a single light-emitting diode;

the third optical module able to generate a light beam with flat cutoff comprises at least two light-emitting diodes.

The present invention also relates to a set of lighting devices according to the present invention. Preferably this set of lighting devices can also exhibit one or more of the following supplementary features; any combination of these supplementary features, insofar as they do not mutually exclude one another, constitutes an advantageous exemplary embodiment of the invention:

this set consists of a first lighting device and a second lighting device, which are lighting devices according to the present invention, the second optical module of the first lighting device exhibiting a substantially L-shaped cutoff, the horizontal part of which extends towards the right, and the second optical module of the second lighting device exhibiting a substantially L-shaped cutoff, the horizontal part of which extends towards the left; and the first lighting device is a first motor vehicle headlight and the second lighting device is a second motor vehicle headlight.

The present invention also relates to a method for automatically adapting a light beam generated by a set of lighting devices according to the present invention, of a first motor vehicle running along a road, this method comprising the steps of:

detecting the presence of at least one second vehicle, being followed or passed not to be dazzled;

possibly determining a position of the second vehicle on the road; the method comprising the additional steps of:

generating a selective light beam by means of the second optical module of the first lighting device and the second optical module of the second lighting device, the optical module of the first lighting device generating a light beam exhibiting a substantially L-shaped cutoff, the horizontal part of which extends towards the right, and the optical module of the second lighting device generating a light beam exhibiting a substantially L-shaped cutoff, the horizontal part of which extends towards the left, so that the difference between the two vertical rises of the cutoff lines of these two light beams creates a shadow zone in the selective beam;

positioning the shadow zone on the position of the second vehicle.

This method, in addition to the principal features stated in the preceding paragraph, can also exhibit one or more of the following supplementary features; any combination of these supplementary features, insofar as they do not mutually exclude one another, constitutes an advantageous exemplary embodiment of the invention:

it comprises an additional step of superimposing, onto the selective light beam, a light beam of the dipped beam type, generated by the first optical module of the second lighting device, on a road with right-hand traffic or of the first lighting device, on a road with left-hand traffic.

the light beam of the dipped beam type is generated by a light-emitting diode, the intensity level of which is determined by at least one parameter, the parameter being:

temperature information of the first optical module and/or of the second optical module; and/or range correction information.

The present invention also relates to a motor vehicle comprising the set of lighting devices according to the invention.

The invention in its various applications will be understood better from reading the following description and an examination of the figures which accompany it.

These are presented only by way of indication and are in no way limitative of the invention.

BRIEF DESCRIPTION OF THE ACCOMPANYING DRAWINGS

DETAILED DESCRIPTION OF THE PREFERRED EMBODIMENTS

The elements appearing on various figures, unless otherwise specified, have kept the same reference. Various designations of position, for example "below", "above", "vertical", "higher", and "lower" should be considered under conditions of normal road traffic or use of the set of lighting devices according to the invention, when the latter is installed to function on a motor vehicle. The object of the invention is described for a set of lighting devices equipping a vehicle adapted to right-hand traffic conditions. The object of the invention is obviously directly transposable to the left in left-hand traffic conditions.

Figure 1:
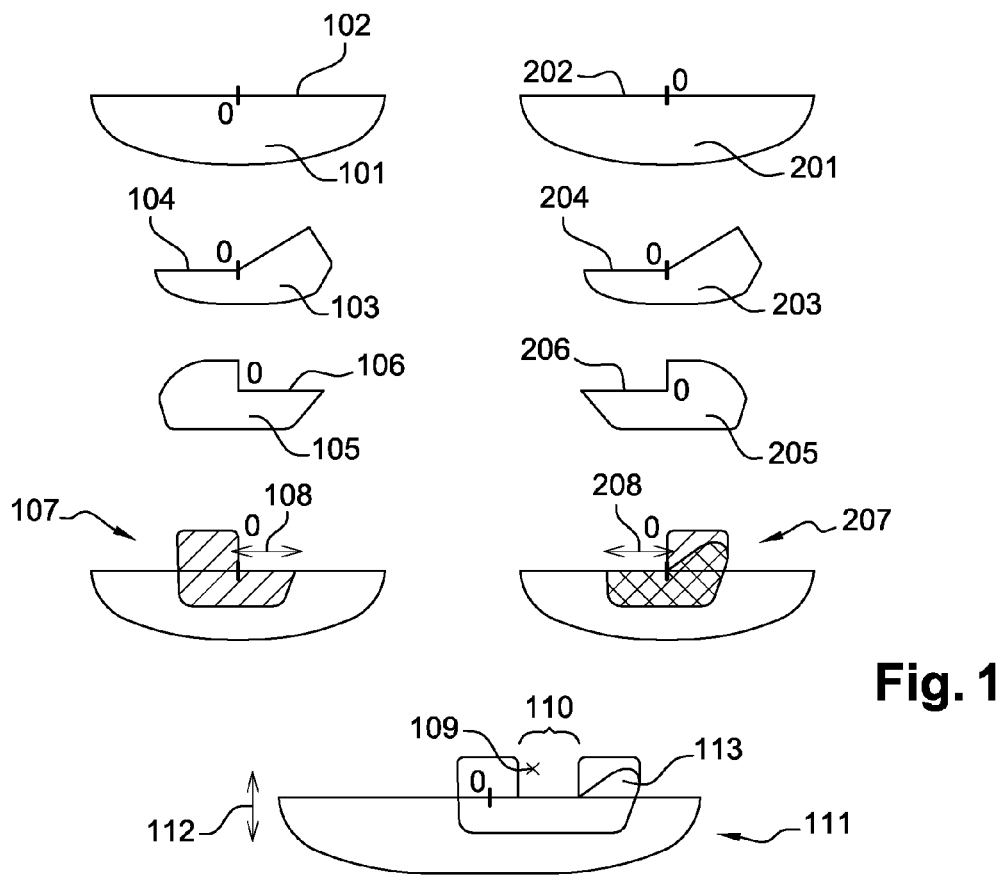
FIG. 1 is various examples of light beams generated by the set of devices according to the invention.

On FIG. 1, various examples of light beams able to be generated by a first lighting device and a second lighting device of the set according to the invention are illustrated.

Thus, the first lighting device, which here is a left-hand front lighting device, generates:

a first elementary light beam 103, exhibiting a cutoff 104 corresponding to a conventional dipped beam for driving on the right;

a second elementary light beam 105, exhibiting an L-shaped cutoff 106;

a third elementary light beam 101, exhibiting a flat cutoff 102.

Superimposition of the first and second elementary beams which have just been quoted results in a left-hand light beam 107.

In the same way the second lighting device, which is a right-hand front lighting device, generates:

a first elementary light beam 203, exhibiting a cutoff 204 corresponding to a conventional dipped beam for driving on the right;

a second elementary light beam 205, exhibiting an L-shaped cutoff 206;

a third elementary light beam 201, exhibiting a flat cutoff 202;

Superimposition of the three elementary beams which have just been quoted results in a right-hand light beam 207.

L-shaped cutoff means a cutoff line with a roughly horizontal first part, which is interrupted by a substantially vertical rise, that is to say ranging between 45° and 135°, of the cutoff in question, the horizontal part of the cutoff in question extending either towards the right or towards the left of the substantially vertical rise. Thus, the cutoff lines 106 and 206 mentioned above, in one particular example, can be symmetrical to each other. In other exemplary embodiments they are not symmetrical to each other. In the example illustrated, the second elementary light beam 105 of the left-hand lighting device exhibits an L-shaped cutoff, the horizontal part of which is towards the right in the elementary beam 105, whereas the second elementary light beam 205 of the right-hand lighting device exhibits an L-shaped cutoff, the horizontal part of which is towards the left in the elementary beam 205.

On the various light beams illustrated, the optical axis of the optical module generating the elementary beam in question is marked by the reference O. The various light beams which have just been mentioned are advantageously generated by distinct optical modules disposed inside each of the two lighting devices in question, the nth elementary beam being produced by an nth optical module. Optical module, in the present application, means an optical system comprising at least one light source, possibly disposed in a reflector, sometimes on a complex surface, and possibly associated with one or more dioptrical elements of the reflector type or lens face type.

Figure 4:
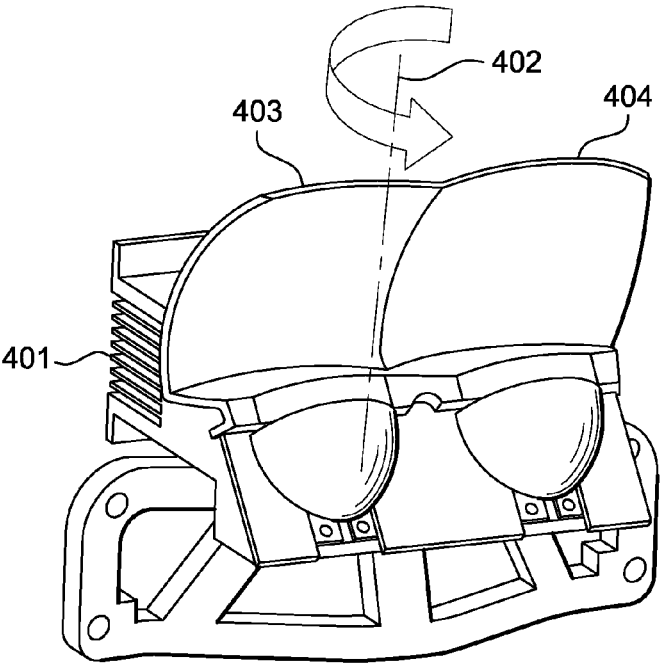
FIG. 4 is a partial representation of one of the lighting devices able to be used in an exemplary embodiment of the set of lighting devices according to the invention.

According to one essential feature of the invention, as illustrated on FIG. 4, it is proposed, inside at least one of the two lighting devices of the set according to the invention, to mount the first optical module, reference 403, and the second optical module, reference 404, on a support 401 able to make a rotation movement on an approximately vertical axis of rotation 402. Thus, the first and second elementary light beams, due to the rotation of support 401 about axis 402, are able to move roughly horizontally, as illustrated by a first arrow 108 and a second arrow 208 shown on FIG. 1. In an advantageous embodiment the first and second optical modules are mounted on such a support in the first lighting device and in the second lighting device.

Activation of the second optical modules of the two lighting devices makes it possible to generate a selective light beam: once the position of a vehicle 109, being passed or followed, is determined by known techniques, utilizing for example notably a camera and image-processing algorithms, support 401 rotates so as to leave, in a global light beam 111, a space that is not illuminated above the horizon only around an angular portion 110 containing the vehicle 109.

According to an alternative embodiment, activation of one of the first optical modules makes it possible to advantageously generate a progressive light beam by reinforcing the luminous intensity around a certain zone 113 of the global light beam 111, the zone 113 corresponding to the luminous coverage of the elementary light beam 203 corresponding to the conventional dipped beam. In the example illustrated on FIG. 1, the vehicle equipped with the devices according to the present invention is travelling on the right. Consequently in the lighting device located on the right, the first module is switched on at the same time as the second module and the first module generates a first elementary light beam 203, exhibiting a cutoff 204 corresponding to a conventional dipped beam for driving on the right which, being superimposed onto the second elementary beam 205, results in reinforcing the lighting in the part located on the right of the horizontal part of the cutoff of the first elementary beam 205, thus reinforcing the lighting on the verges and on the right of the detected vehicle. On the other hand the first module of the left-hand lighting device is switched off and the second module is switched on.

In an advantageous example the light-emitting diode of the third optical module is switched on progressively, according to a control strategy determined beforehand. Thus, for example, in order to determine the luminous intensity of the diode, the control strategy takes into account at least one of the following parameters in order to determine the luminous intensity of the diode:

temperature information of the optical module in which the diode is disposed; the intensity of the diode for example can thus be reduced if too a high temperature is detected, near to the acceptable limit for operation of the diode, in order to cause a drop in the temperature;

range correction information: by determining the position of a vehicle being followed or passed, the range correction can be used to raise the light beam generated by the set of lighting devices according to the invention; advantageously the intensity of the diode in question can vary as a function of the range correction information provided the higher the range correction, the higher the intensity of the diode in question.

In an advantageous embodiment, in order to improve the progressive character of the global light beam, vertical displacement means 112 of the global light beam 111 are used. These means can consist of any mechanism making it possible to move the global light beam vertically, particularly the pitch angle correction or range correction mechanism.

Advantageously, in the invention, the light sources used are of the LED type. Thus, compared to light sources of the discharge lamp type, great amplitude is provided in the variation of the intensity of each elementary light beam generated by an optical module comprising at least one LED, and particularly of the second and third elementary light beams. The variation in luminous intensity thus produced by each optical module increases performance in terms of progressive generation of the light beam.

In the examples illustrated on FIG. 1, it is also possible by means of the device to obtain a beam of the conventional dipped beam type by switching off the second modules and by switching on the first. With the lighting devices illustrated on FIG. 1, the dipped beam would be obtained, for the left-hand lighting device, by superimposition of the first elementary beam 103 and the third elementary beam 101 and, for the right-hand lighting device, by superimposition of the first elementary beam 203 and the third elementary beam 201. The dipped beam generated by the set of lighting devices of the vehicle will result from the fusion of these four elementary beams 101, 103, 201 and 203.

Figure 2:
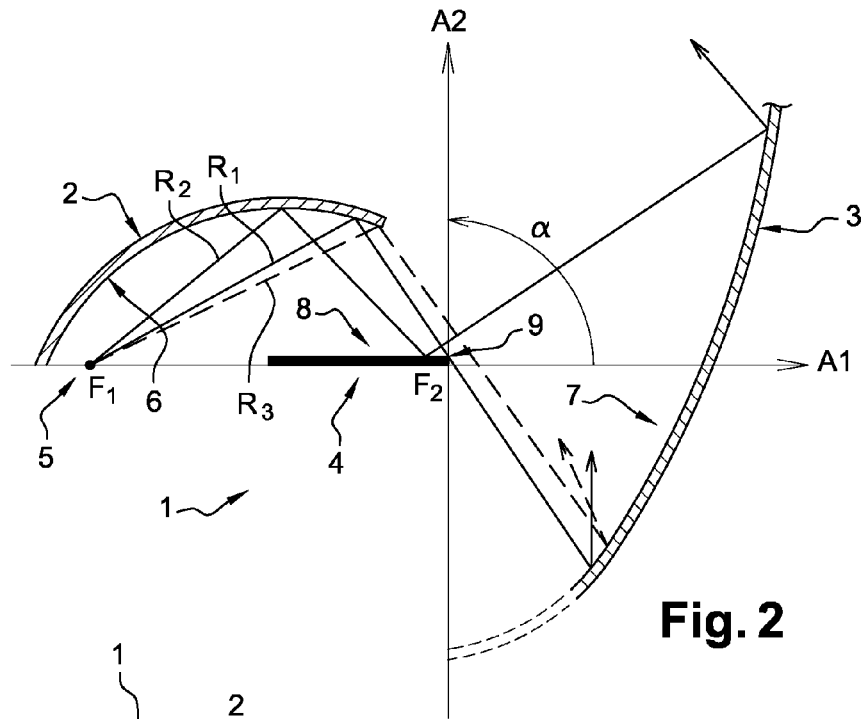
FIG. 2 is a schematic representation, in cross section, of an example of the optical module according to the invention.
Figure 3:
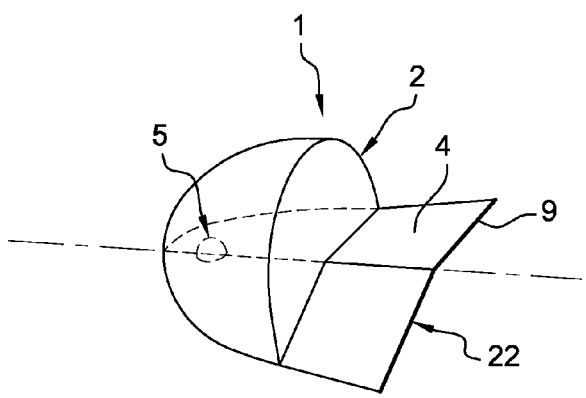
FIG. 3 is a schematic representation, in perspective, of an example of the optical module according to the invention.

In an advantageous exemplary embodiment of the system according to the invention, notably in terms of bulk and production costs, the optical modules used correspond to the optical module 1 illustrated on FIGS. 2 and 3.

Optical module 1 comprises:
a first reflector 2;
a second reflector 3;
a third reflector 4; and
a light source 5.

First reflector 2 is a reflector of the elliptical type having:
two focuses F1 and F2;
an optical axis A1; and
a substantially elliptical reflective surface 6.

The approximately elliptical surface 6 of revolution is implemented in the shape of an angular segment and extends in the half space situated above an axial plane perpendicular to the plane of the sheet and comprising the optical axis A1. As a first approximation, surface 6 is semi-ellipsoidal.

However, it should be noted that surface 6 may not be perfectly elliptical and can have several profiles specifically designed to optimize luminous distribution in the light beam generated by module 1. This implies that first reflector 2 does not have a perfect surface of revolution.

The light source 5 is arranged substantially in line with the first focus F1 of first reflector 2.

As stated above, advantageously, the light source 5 is a light-emitting diode which emits most of its luminous energy towards the reflective inner face of the approximately elliptical surface 6.

Second reflector 3 comprises:
a focus roughly in line with the second focus F2 of first reflector 2;
an optical axis A2; and
a reflective surface 7.

The optical axis A2 is substantially parallel to the longitudinal axis of a vehicle, not illustrated, and equipped with the lighting module 1.

Optical axis A1 forms an angle α with the optical axis A2. In the example illustrated angle α is equal to 90°; in other exemplary embodiments however, a different angle is possible.

According to a first embodiment, reflective surface 7 has a substantially parabolic shape, the axis of the parabola being the optical axis A2.

Third reflector 4, so called folder, is situated between first reflector 2 and second reflector 3 and comprises at least one higher reflective surface 8 and a front end edge 9, known as cutoff edge.

The cutoff edge 9 is arranged in the vicinity of the second focus F2 of first reflector 2.

The operating principle of the optical module 1 is as follows:

For this purpose we will consider three luminous rays R1, R2 and R3 emanating from the light source 5.

As the light source 5 is arranged in line with the first focus F1 of first reflector 2, the major part of the rays emitted by source 5, after being reflected on inner face of surface 6, is returned towards the second focus F2 or in the vicinity of the latter. This is the case of ray R1 which passes along the cutoff edge 9. R1 is then reflected on surface 7 of second reflector 3 along a direction substantially parallel to the optical axis A2 of second reflector 3.

However other rays, after being reflected on inner face of surface 6, can reflect on surface 8 of third reflector 4; this is the case of R2. R2 will then again be reflected on parabolic surface 7 and this reflection will be directed towards the left in the plane of FIG. 1. Ray R2 is thus emitted under the cutoff in the light beam. Without the reflection of R2 on surface 8, ray R2 would have been unacceptable (because above the cutoff).

Other rays, of the type R3, can pass above edge 9. In such a case, ray R3 is also emitted under the cutoff in the light beam.

An advantage of the optical module 1 is thus that it does not eclipse a major part of the luminous rays emitted by source 5, as is the case with a conventional lighting module comprising a mask.

Reflective surface 8 makes it possible "to fold" the images of the light source 5 which are reflected by elliptical surface 6 of first reflector 2 of the second focus F2.

The "fold" created by this "folding" of images contributes to the formation of a clean cutoff in the light beam reflected by second reflector 3.

Angle α is selected and optimized by using the property of the diodes to emit only in a half space so that first reflector 2 does not intercept part of the flux reflected by second reflector 3. The angle chosen here is equal to 90° but this angle may also be higher than 90° in order to obtain a more compact module while making it possible that first reflector 2 does not to intercept part of the flux reflected by second reflector 3.

In such optical modules it is the shape of the cutoff edge 9 which determines the shape of the cutoff line of the elementary beam generated by the optical module in question. For example, by choosing a cutoff edge of the type shown on FIG. 3, where the folder comprises two upper surfaces comprised in planes with an angle of 15°, a cutoff allowing the conventional European dipped beam function to be fulfilled is obtained. To achieve an L-shaped cutoff, the cutoff edge must exhibit the shape of an "L", with a first part and a second part between them forming an angle close to 90°, more generally ranging between 45° and 135°.

In the case of a third module, intended to form an elementary beam 101, the folder has a surface without interruptions, this surface allowing the formation of a flat horizontal cutoff.

Figure 5:
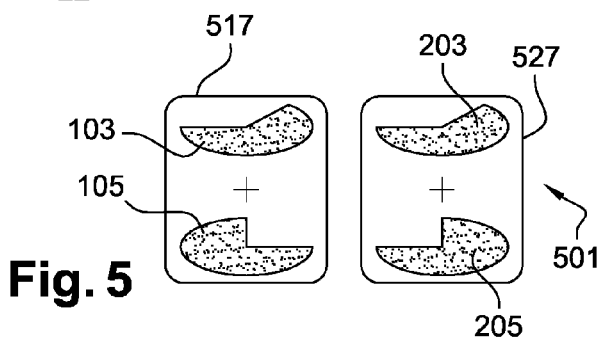
FIGS. 5 and 6 are various combinations of luminous beams likely to be found in the sets of lighting devices according to the invention are illustrated.
Figure 6:
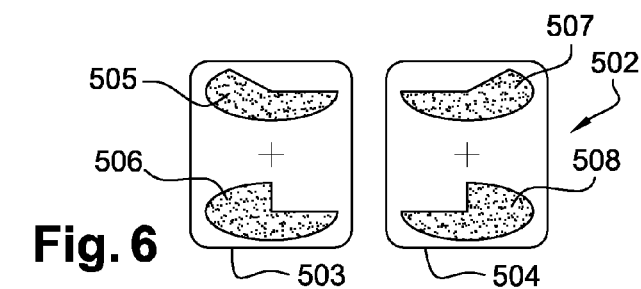

On FIGS. 5 and 6 various combinations of light beams in right-hand traffic likely to occur at the time of various alternatives of the inventive method are illustrated.

Thus, on FIG. 5, a first alternative 501 corresponds to the combination of the variable beams detailed in the description of FIG. 1. Array 517 of elementary beams which can be generated by the left-hand lighting device is illustrated on the left and array 527 of the elementary beams which can be generated by the right-hand lighting device is illustrated on the right on FIG. 5. As seen previously, according to an alternative method the first elementary beams 103 and 203 of two lighting devices according to the present invention can be generated at the same time in order to produce a conventional dipped beam. As described on FIG. 1, the second elementary beams 105 and 205 can be combined in order to produce a selective beam, possibly combining the first elementary beam 203 on the right-hand side to improve the range of the selective beam and thus render it progressive.

According to a second alternative 502 it is proposed that a left-hand headlight device 503 is produced equipped with a first optical module and a second optical module, according to the terminology employed above, generating a light beam 505 of the dipped beam type for left-hand traffic conditions and a light beam 506 with an L-shaped cutoff, with the horizontal part on the right. In a symmetrical way, it is proposed that a right-hand headlight device 504 is produced equipped with a first optical module and a second optical module, according to the terminology employed above, generating a light beam 507 of the dipped beam type for right-hand traffic conditions and a light beam 508 with an L-shaped cutoff, with the horizontal part on the left respectively. With such light beams, particularly a selective light beam, the luminous intensity of which can be reinforced on the right as well as on the left of a non-illuminated central zone, may be generated by controlled and staggered activation of the diodes equipping the second optical modules, creating beams of the dipped type.

According to a third alternative, not illustrated, the left-hand lighting device comprises three lighting modules generating elementary beams, such as beams 103, 105 and 505 respectively, and the right-hand lighting device comprises three lighting modules generating elementary beams, such as beams 203, 508 respectively and a beam identical to beam 505. Thus, according to the regulations in the country in which the vehicle is driven, a dipped beam can be generated for left-hand traffic or a dipped beam for right-hand traffic, as well as a selective beam as described above, reinforced on either side by the shadow zone according to the desired range.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A lighting device comprising:
a support for optical modules able to make a rotation movement on an approximately vertical axis;
a first optical module mounted on said support and able to generate a light beam exhibiting a cutoff of the dipped beam type;
a second optical module mounted on said support and able to generate a light beam exhibiting a substantially L-shaped cutoff, with a roughly horizontal first part, which is interrupted by a rise ranging between 45° and 135° relative to said roughly horizontal first part of the cutoff in question, said roughly horizontal first part of the cutoff in question extending either towards a first direction or towards a second direction of said rise; and
said first optical module and said second optical module being driven about said approximate vertical axis in response to a rotation movement of said support which causes a generally horizontal movement of both said first and second optical modules.

2. The lighting device according to claim 1, wherein said lighting device further comprises a third optical module able to generate a light beam with flat cutoff.

3. The lighting device according to claim 2, wherein at least one of said first optical module, said second optical module or the third optical module comprises at least one light source of the light-emitting diode type.

4. The lighting device according to claim 3, wherein said first optical module comprises a single light-emitting diode.

5. The lighting device according to claim 3, wherein said second optical module comprises a single light-emitting diode.

6. The lighting device according to claim 2, wherein said first optical module, said second optical module or the third optical module comprises at least one light source of the light-emitting diode type.

7. The lighting device according to claim 2, wherein said first optical module comprises a single light-emitting diode.

8. The lighting device according to claim 2, wherein said second optical module comprises a single light-emitting diode.

9. The lighting device according to claim 2, wherein said lighting device comprises a third optical module able to generate a light beam with flat cutoff and comprising a single light-emitting diode.

10. The lighting device according to claim 1, wherein said first optical module comprises a single light-emitting diode.

11. The lighting device according to claim 10, wherein said second optical module comprises a single light-emitting diode.

12. The lighting device according to claim 1, wherein said second optical module comprises a single light-emitting diode.

13. The lighting device according to claim 1, wherein said lighting device comprises a third optical module able to generate a light beam with flat cutoff and comprising a single light-emitting diode.

14. The lighting device according to claim 1, wherein said lighting device comprises a third optical module able to generate a light beam with flat cutoff and comprising at least two light-emitting diodes.

15. A set of lighting devices made up of a first lighting device and a second lighting device, wherein said first lighting device is a lighting device according to claim 1, and in that the second lighting device is a second lighting device according to claim 1, the second optical module of the first lighting device exhibiting a first substantially L-shaped cutoff, a horizontal part of said first substantially L-shaped cutoff extending towards said first direction, and the second optical module of the second lighting device exhibiting a second substantially L-shaped cutoff, a horizontal part of said second substantially L-shaped cutoff extending towards said second direction.

16. The set of lighting devices according to claim 15, wherein said first lighting device is a first motor vehicle headlight and said second lighting device is a second motor vehicle headlight.

17. A motor vehicle comprising the set of lighting devices according to claim 16.

18. A motor vehicle comprising the set of lighting devices according to claim 15.

19. The lighting device of claim 15, wherein said first substantially L-shaped cutoff and said second substantially L-shaped cutoff cooperatively generate a selective light beam having a shadow zone.

20. The set of lighting devices according to claim 15, wherein said first direction is toward the right and said second direction is towards the left.

21. The lighting device according to claim 1, wherein said first direction is toward the right and said second direction is towards the left.

22. A method for automatically adapting a light beam generated by a set of lighting devices of a first motor vehicle running along a road, said method comprising the steps of:
  detecting the presence of at least one second vehicle, being followed or passed, not to be dazzled;
  determining a position of the at least one second vehicle on the road;
  generating a selective light beam using a first optical module of a first lighting device and a second optical module of a second lighting device, said first optical module of the first lighting device generating a light beam exhibiting a substantially L-shaped cutoff, the horizontal part of which extends towards a first direction, and said second optical module of the second lighting device generating a light beam exhibiting a substantially L-shaped cutoff, the horizontal part of which extends towards a second direction, so that the difference between the two vertical rises of the cutoff lines of these light beams from the first and second optical modules creates a shadow zone in the selective beam;
  positioning the shadow zone on the position of the at least one second vehicle.

23. The method for automatically adapting a light beam according to claim 22, wherein said method comprises an additional step of superimposing, onto the selective light beam, a light beam of the dipped beam type, generated by the first optical module of the second lighting device on a road with right-hand traffic, or of the first lighting device on a road with left-hand traffic.

24. The method for automatically adapting a light beam according to claim 23, wherein said light beam of the dipped beam type is generated by a light-emitting diode, the intensity level of which is determined by at least one parameter, said parameter being:
  temperature information of said first optical module and of the second optical module; and
  range correction information.

25. The method for automatically adapting a light beam according to claim 22, wherein said first direction is toward the right and said second direction is towards the left.

26. A method for automatically adapting a light beam generated by a set of lighting devices of a first motor vehicle running along a road, said method comprising the steps of:
  detecting the presence of at least one second vehicle, being followed or passed, not to be dazzled;
  determining a position of the at least one second vehicle on the road;
  generating a selective light beam using a first optical module of a first lighting device and a second optical module of a second lighting device, said first optical module of said first lighting device generating a light beam exhibiting a substantially L-shaped cutoff, the horizontal part of which extends towards a first direction, and said second optical module of said second lighting device generating a light beam exhibiting a substantially L-shaped cutoff, the horizontal part of which extends towards a second direction, so that the difference between the two vertical rises of the cutoff lines of these light beams from the first and second optical modules creates a shadow zone in the selective beam; and
  positioning the shadow zone on the position of the at least one second vehicle.

* * * * *